United States Patent [19]

Bradshaw et al.

[11] Patent Number: 4,873,841
[45] Date of Patent: Oct. 17, 1989

[54] PORTABLE COOLER

[76] Inventors: William Bradshaw, 9144 S. Massasoit, Oak Lawn, Ill. 60453; Robert Shepard, 6101 LaGrande, Oak Forest, Ill. 60452

[21] Appl. No.: 331,796

[22] Filed: Apr. 3, 1989

[51] Int. Cl.⁴ ............................................. B60H 1/32
[52] U.S. Cl. .................................... 62/239; 62/457.1; 62/457.7; 280/47.17
[58] Field of Search ............ 280/47.17; 62/239, 457.1, 62/457.7; 220/1 V

[56] References Cited

U.S. PATENT DOCUMENTS

| | | | |
|---|---|---|---|
| 2,317,871 | 4/1943 | Zimmerman | 62/457.1 X |
| 3,591,194 | 7/1971 | Vega | 62/457.1 X |
| 4,164,853 | 8/1979 | McDonough | 62/457.1 |
| 4,724,681 | 2/1988 | Bartholomew et al. | 62/239 |

Primary Examiner—Lloyd L. King
Attorney, Agent, or Firm—Irving Faber

[57] ABSTRACT

A portable cooler comprising a cooling compartment having a pair of wheels coupled thereto at one end thereof and having a handle positioned on and coupled to one side of the cooling compartment opposite said wheels for pulling the portable cooler. The handle is angularly adjustable about an axle when the cooler is being pulled and is secured to the cooler when not in use. A pair of lifting handles are positioned on opposite sides of the cooler for lifting the cooler to and from a vehicle.

15 Claims, 2 Drawing Sheets

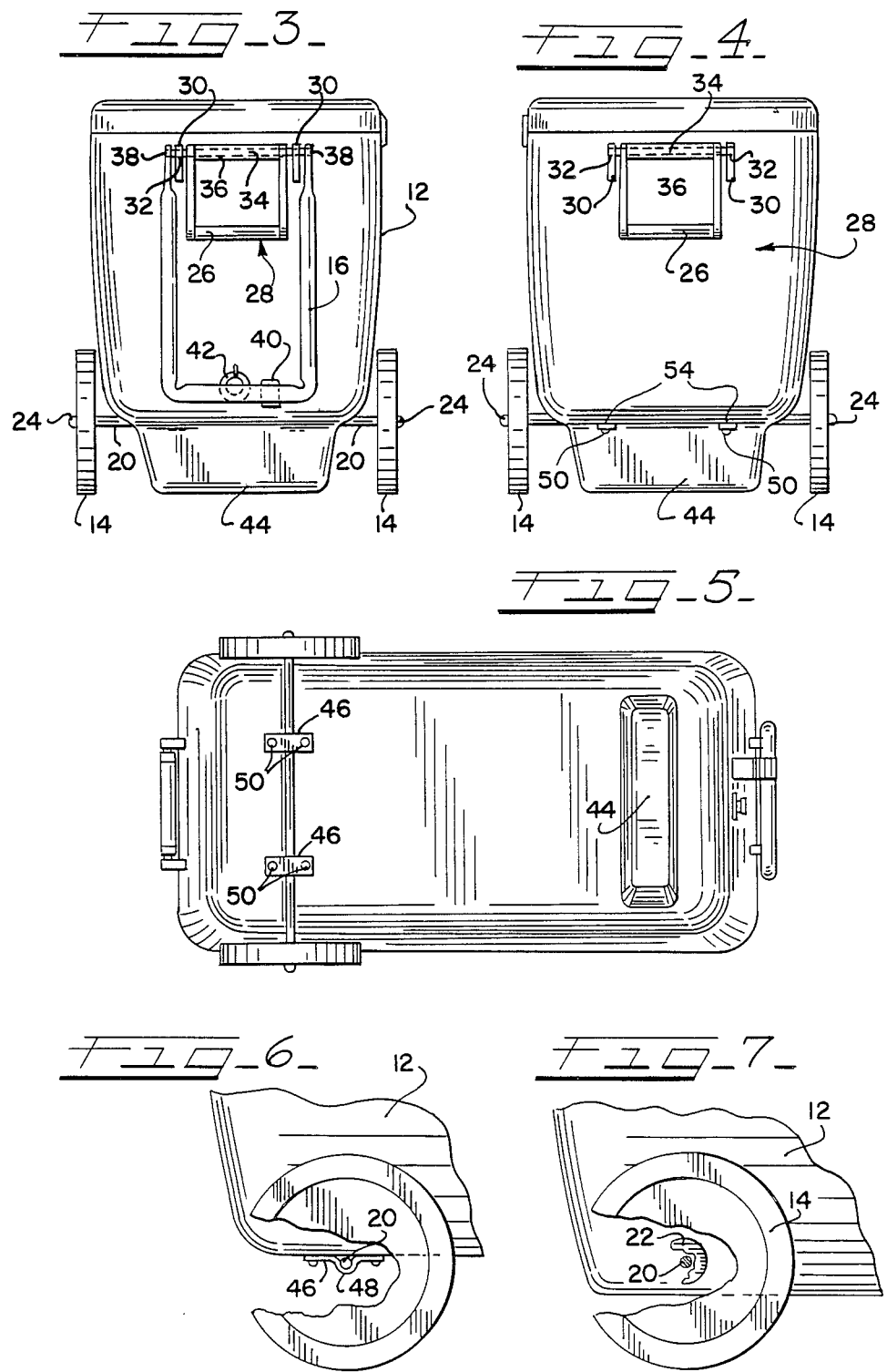

PORTABLE COOLER

BACKGROUND OF INVENTION

In todays mobile society people are taking food to picnic's, concerts, parks, the beach and so forth. To carry the food and preserve it for as long as possible, coolers of all sorts and kinds are used, from the simplest made of Styrofoam to the fancy insulated metal coolers. In essence, a cooler, whatever type is used, is generally packed with ice and food. The better the insulation the longer the time the ice will take to melt and the longer the time the food within the cooler will stay fresh. During the summer one can see many people carrying "coolers" individually or with other people, depending on the weight and size of the cooler.

Many people have injured their back and/or legs and/or arms carrying coolers from their cars to their ultimate destination at the beach, park, concert or the like, let alone the bruises one receives as the coolers bang against various parts of ones body.

The portable cooler we describe in our preferred embodiment is easily transportable and when not in use does not take up any more room than the cooler itself. Our portable cooler, unlike those existing in the market, is compact, having a pair of wheels coupled to the underside of one end of the cooler and a pair of lifting handles on opposite sides of the cooler for lifting the cooler to and from a vehicle.

A pulling handle is coupled to the lifting handle positioned on the side opposite the wheels. The pulling handle swivels about an axle when in use so as to enable the best leverage between cooler and person to be obtained. This enables the least amount of force to be exerted by the person pulling the cooler. The pulling handle is free to rotate around an axle coupled to the side of the cooler. When not in use the pulling handle snaps to the side of the cooler. A stub is provided at the bottom of the cooler, opposite the wheels, to keep the cooler almost level when it is not being pulled. A drain plug is positioned on the side of the cooler, opposite the wheels; the stub being of a height so as to create a slope from the side of the cooler where the wheels are positioned to the opposite side enabling the melted ice to flow from the drain.

BRIEF SUMMARY OF INVENTION

It is an object of our invention to provide a portable cooler that can be easily pulled without injury to the person pulling it.

It is another object of our invention to provide a portable cooler having a pair of wheels coupled to the underside of one end of the cooler and a pulling handle coupled to the side of the cooler opposite the wheels.

It is a further object of our invention to provide a portable cooler wherein the pulling handle is snapped to the cooler and not extended when not being pulled.

It is a further object of our invention to provide a portable cooler having a pair of lifting handles on opposite sides of the cooler for lifting the cooler to and from a vehicle.

IN THE DRAWINGS

FIG. 1 is a perspective view of our portable cooler.
FIG. 2 is a front view of our portable cooler.
FIG. 3 is a side view of our portable cooler illustrating the wheels and the lifting and pulling handle attached to the cooler.
FIG. 4 is a side view of the cooler illustrating the lifting handle.
FIG. 5 is a bottom view of the cooler illustrating the attachment of the wheels of the cooler.
FIG. 6 is a cut-a-way view illustrating the wheel coupled to our portable cooler.
FIG. 7 is a cut-a-way view illustrating the wheels coupled to an axle through the cooler.

DESCRIPTION OF PREFERRED EMBODIMENT

Figure 1:
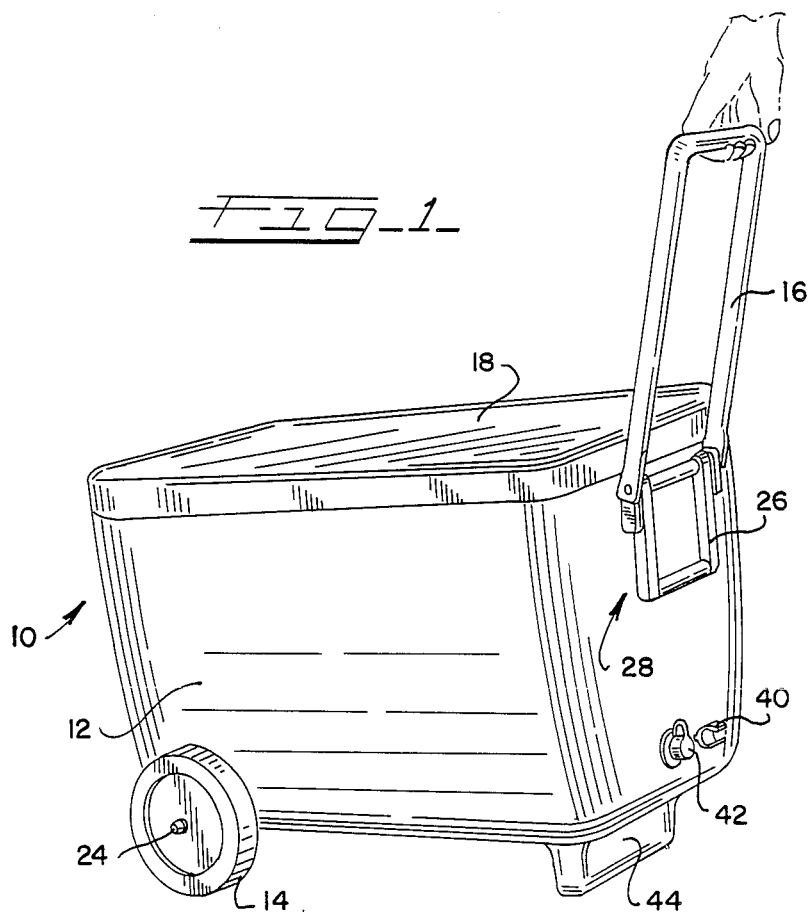
Figure 2:
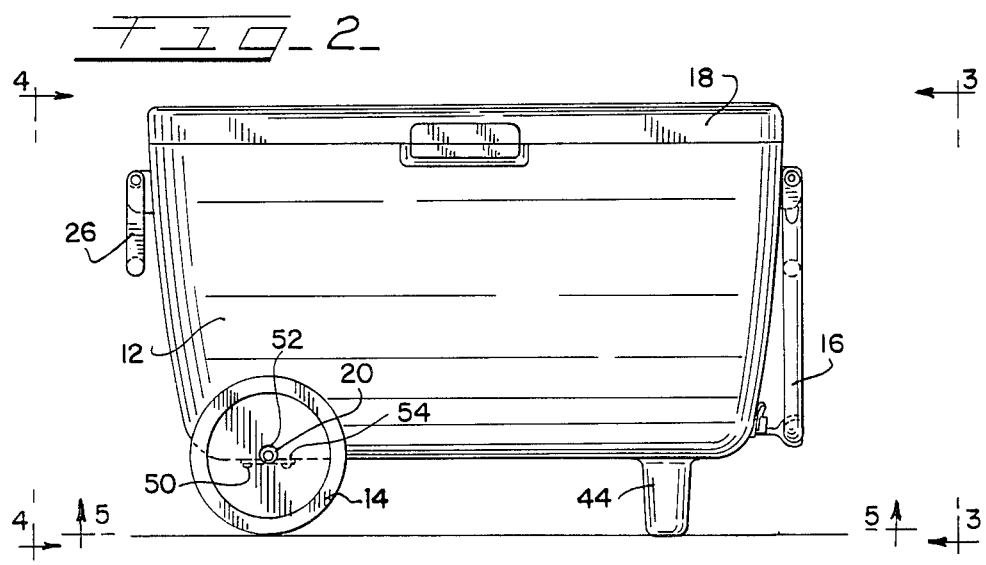

This invention relates to a new and useful portable cooler 10 suitable for being easily transported from a vehicle to a picnic, outing or the like and back to the vehicle.

The portable cooler 10 comprises three basic sections, a cooler compartment 12, a pair of wheels 14 coupled to the cooler 10 at one end and a pulling handle 16 coupled to a side of the cooler opposite the wheels 14.

In our preferred embodiment, I use a commercial insulated cooler box or compartment 12 having a hinged cover 18. There are many insulated cooler boxes well known in the art and readily available in the market that can be readily adapted in accordance with our invention to be easily transported from place to place without the necessity of carrying the cooler 12. If a commercial insulated cooler is not used, a cooler compartment 12 may be fabricated having insulated sides, top and bottom, and used in lieu thereof.

In our preferred embodiment, the pair of wheels 14 are coupled to an axle 20 that is positioned through an axle aperture, not illustrated, through the cooler compartment 12 at the lower portion of one end thereof. The axle aperture is generated through the cooler compartment 12 by means well known in the art. The axle 20 extends through the lower portion of one end of the cooler box 12 and beyond the sides of said cooler compartment 12 a sufficient distance to couple and secure thereto the wheels 14. A spacer 22 is positioned on the axle 20 between the cooler compartment 12 and the wheels 14 to inhibit the wheels from rubbing against the cooler compartment 12. A wheelnut 24 secures the wheel 14 to the axle 20 between the wheel spacer 22 and the wheel nut 24, enabling the wheel to freely rotate about the axle 20.

At opposite ends, one end of which being the end said wheels are positioned, of the cooler box 12, are positioned lifting handles 26, coupled to lifting handle support structures 28. The handle support structure 28 comprises a pair of handle support flanges 30 coupled to the side of the cooler by means well known in the art, such as by screws, glue, etc. The flanges 30 have an aperture 32 suitable for receiving a handle axle 34. The handle 26 has an aperture 36 suitable for receiving the axle 34 enabling it to freely rotate thereabout. Axle retaining means, such as retaining pins, not illustrated, but well known in the art, are coupled to each end of the handle axle 34 inhibiting it from slipping out of the support flanges 30.

The pulling handle 16 is coupled to the lifting handle support structure 28 positioned opposite the wheels 14. The pulling handle 16 is of a length suitable for enabling a person to easily pull the portable cooler 10 without stooping. The pulling handle 16 has a pair of pulling handle apertures 38 suitable for being received by the handle axle 34. The pulling handle 16 is positioned on the outside of the handle support flanges 30 and coupled to the handle axle 34. The handle 16 is secured to the handle axle 34 by retaining pins, not illustrated, but well known in the art, or by other suitable means well known in the art. The axle 34 extends beyond the support flanges 30 a sufficient length to enable it to extend through the pulling handle apertures 38. The handle 16 may be rotated about the handle axle 34 for pulling the portable cooler 10. When not in use, i.e., being pulled, the handle 16 fits snuggly against a handle clip 40 coupled to the cooler box 12, by means well known in the art enabling the handle 16 to fit snuggly therein, however, being easily removed therefrom when the portable cooler 10 is to be pulled.

A drain opening 42 is provided at the lower end of the side of the cooler 12 opposite the wheels 14 to enable easy drainage of the melted ice in the cooler.

A base stand or stub 44 is positioned and coupled to the underside of the cooler 12 opposite the pair of wheels 14. The stub 44 is of a height to create a slope from the wheels 14 to said stub 44, thereby enabling the melted ice to flow to and out of the drain opening 42.

If an axle aperture is not positioned through the cooler compartment 12 as hereinabove described, the wheels 14 can be coupled to the cooler box 12 by coupling to the underside of the cooler compartment 12, axle support extensions 46 having a semi-circular groove 48 provided therein suitable for receiving the axle 20. The axle support extension 46 are coupled to the underside of the cooler compartment 12 by means of screws, 50, or by other means well known in the art.

Another embodiment of our invention is to provide a semi-circular groove 52 within the underside of the cooler compartment 12 suitable for receiving the axle 20. A flat bracket 54 suitable for receiving screws 50 is positioned perpendicular to the axle 20 retaining said axle within the groove 52. Screws 50 secure the bracket 54 to the underside of the cooler compartment 12; the axle 20 extending beyond the sides of the cooler compartment 12. The wheels 14 are coupled to each end of the axle and secured thereto by wheel nuts 24.

Wheel spacers 22 or other means may be positioned on the axle 20 to inhibit the wheels from rubbing against the cooler when being pulled, in all of the above described embodiments.

In operation our portable cooler 10 comprises three basic sections, the cooler compartment 12, a pair of wheels 14 coupled to the cooler compartment 12 and a pulling handle 16. A pair of handle support structures 28 are positioned on opposite sides of the cooler compartment 12 having a lifting handle 26 coupled thereto for lifting the portable cooler 10 to and from a vehicle. The handle 16 is coupled to the handle support structure 28, opposite the pair of wheels 14. The handle 16 rotates about handle axle 16 when the cooler 10 is being pulled. When not in use for pulling the portable cooler, the handle is positioned along and snuggly fits into the handle clip 40 on the side of the cooler compartment 12 making the portable cooler 12 compact and efficient.

It is understood that the above described portable cooler is simply illustrative of the application of principles of our invention, and many other modifications, including the use of other materials may be made without departing from the spirit and scope of our invention.

We claim:

1. A portable cooler comprising:
   a cooling compartment;
   an axle positioned through the lower portion of one end of the cooling compartment and extending beyond the sides of the cooling compartment;
   a pair of wheels, one of which is coupled to each end of the axle;
   a wheel nut coupled to the end of axle securing said wheels to the axle;
   a pair of handle support structures coupled to opposite sides of the cooler compartment each support structure having a handle support axle;
   a lifting handle coupled to the handle support axle of each handle support structure enabling the cooler to be easily lifted to and from a vehicle; and
   a pulling handle coupled to one of the handle support axles wherein said pulling handle being easily rotated about the handle axle enabling a user to easily and comfortably pull the portable cooler.

2. A portable cooler as set forth in claim 1 wherein the handle support structure further comprises:
   a pair of handle support flanges coupled to the sides of the cooler compartment, said flanges having apertures suitable for receiving the handle support axle.

3. A portable cooler as set forth in claim 2 wherein said portable cooler further comprises a wheel spacer positioned between each side of the cooler compartment adjacent each of the pair of wheels.

4. A portable cooler as set forth in claim 3 wherein said portable cooler further comprises a handle clip positioned on the side of the cooler, suitable for receiving the handle when the portable cooler is not in use.

5. A portable cooler as set forth in claim 4 wherein said portable cooler further comprises a base stand positioned on the underside of the cooler compartment opposite the pair of wheels, said base stand being of a height to create a slope from the wheels to the base stand when the cooler is not in use.

6. A portable cooler comprising;
   a cooling compartment;
   axle support extensions coupled to the underside of said cooling compartment at one end thereof having a semi-circular groove;
   an axle being positioned within the semi-circular groove of the axle support extensions and said axle extending beyond the sides of the cooler compartment;
   a pair of wheels, coupled to each end of the axle;
   a wheel nut coupled to each end of the axle thereby inhibiting the wheel from falling off the axle;
   a pair of handle support structures coupled to opposite sides of the cooler compartment, each support structure having a handle support axle, wherein one of said pair of the handle support structures is positioned on the side of the cooler adjacent the wheels;
   a lifting handle coupled to the handle support axle of each handle support structure; and
   a pulling handle coupled to the handle support axle of the handle support structure opposite the wheels, said pulling handle being easily rotated about the handle axle enabling a user to easily and comfortably pull the portable cooler.

7. A portable cooler as set forth in claim 6 wherein the handle support structure further comprises:
   a pair of handle support flanges coupled to the sides of the cooler compartment, said flanges having apertures suitable for receiving the handle support axle.

8. A portable cooler as set forth in claim 7 wherein said portable cooler further comprises a wheel spacer positioned between each side of the cooler compartment and each of the pair of wheels.

9. A portable cooler as set forth in claim 8 wherein said portable cooler further comprises a handle clip positioned on the side of the cooler suitable for receiving the handle when the portable cooler is not in use.

10. A portable cooler as set forth in claim 9 wherein said portable cooler further comprises a base stand positioned on the underside of the cooler compartment opposite the pair of wheels, said base stand being of a height to create a slope from the wheels to the base stand when the cooler is not in use.

11. A portable cooler comprising;
 a cooling compartment;
 a semi-circular groove positioned on the underside of the cooling compartment at one end thereof suitable for receiving an axle;
 an axle positioned within said semi-circular groove of a length extending beyond the sides of the cooling compartment;
 a pair of wheels coupled to each end of the axle;
 a wheel nut coupled to each end of the axle thereby inhibiting the wheel from falling off the axle;
 a pair of handle support structures coupled to opposite sides of the cooler compartment, each support structure having a handle support axle, wherein one of said pair of the handle support structures is positioned on the side of the cooler adjacent the wheels;
 a lifting handle coupled to the handles support axle of each handle support structure; and
 a pulling handle coupled to the handle support axle of the handle support structure opposite the wheels, said pulling handle being easily rotated about the handle axle enabling a user to easily and comfortably pull said portable cooler.

12. A portable cooler as set forth in claim 11 wherein the handle support structure further comprises;
 a pair of handle support flanges coupled to the sides of the cooler compartment, said flanges having apertures suitable for receiving the handle support axle.

13. A portable cooler as set forth in claim 12 wherein said portable cooler further comprises a wheel spacer positioned between each side of the cooler compartment and each of the pair of wheels.

14. A portable cooler as set forth in claim 13 wherein said portable cooler further comprises a handle clip positioned on the side of the cooler suitable for receiving the handle when the portable cooler is not in use.

15. A portable cooler as set forth in claim 14 wherein said portable cooler further comprises a base stand positioned on the underside of the cooler compartment opposite the pair of wheels enabling the portable cooler to be almost level when not in use.

* * * * *